US008884972B2

(12) United States Patent
Du et al.

(10) Patent No.: US 8,884,972 B2
(45) Date of Patent: Nov. 11, 2014

(54) GRAPHICS PROCESSOR WITH ARITHMETIC AND ELEMENTARY FUNCTION UNITS

(75) Inventors: Yun Du, San Diego, CA (US); Guofang Jiao, San Diego, CA (US); Chun Yu, San Diego, CA (US); Alexei V. Bourd, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1252 days.

(21) Appl. No.: 11/441,696

(22) Filed: May 25, 2006

(65) Prior Publication Data

US 2007/0273698 A1 Nov. 29, 2007

(51) Int. Cl.
| G06F 15/16 | (2006.01) |
| G06F 15/00 | (2006.01) |
| G06T 1/00 | (2006.01) |
| G06F 9/38 | (2006.01) |
| G06F 9/30 | (2006.01) |

(52) U.S. Cl.
CPC .......... G06F 9/3885 (2013.01); G06F 9/30167 (2013.01); G06F 9/383 (2013.01); G06F 9/3851 (2013.01)
USPC .......................................... 345/502; 345/501

(58) Field of Classification Search
CPC ....... G06T 1/00–1/0992; G06T 15/00–15/005; G06T 1/20; G06F 15/00; G06F 15/16–15/161; G06F 15/80
USPC .............. 345/522, 501, 502, 505, 506; 712/1, 712/216
See application file for complete search history.

(56) References Cited

U.S. PATENT DOCUMENTS

| 3,469,244 | A | * | 9/1969 | Perotto et al. ................. 713/500 |
| 4,079,452 | A | | 3/1978 | Larson et al. |
| 4,361,868 | A | * | 11/1982 | Kaplinsky ......................... 711/2 |
| 5,517,611 | A | * | 5/1996 | Deering ........................ 345/503 |
| 5,590,326 | A | | 12/1996 | Manabe |
| 5,598,546 | A | * | 1/1997 | Blomgren ..................... 712/209 |

(Continued)

FOREIGN PATENT DOCUMENTS

| EP | 0627682 | 12/1994 |
| EP | 0676691 A2 | 10/1995 |

(Continued)

OTHER PUBLICATIONS

Wynn, Chris; "nVIDIA OpenGL Vertex Programming on Future-Generation GPUs;" May 8, 2004; NVIDIA Corporation; pp. 1-97.*

(Continued)

*Primary Examiner* — Jacinta M Crawford
(74) *Attorney, Agent, or Firm* — James R. Gambale, Jr.

(57) ABSTRACT

A graphics processor capable of efficiently performing arithmetic operations and computing elementary functions is described. The graphics processor has at least one arithmetic logic unit (ALU) that can perform arithmetic operations and at least one elementary function unit that can compute elementary functions. The ALU(s) and elementary function unit(s) may be arranged such that they can operate in parallel to improve throughput. The graphics processor may also include fewer elementary function units than ALUs, e.g., four ALUs and a single elementary function unit. The four ALUs may perform an arithmetic operation on (1) four components of an attribute for one pixel or (2) one component of an attribute for four pixels. The single elementary function unit may operate on one component of one pixel at a time. The use of a single elementary function unit may reduce cost while still providing good performance.

43 Claims, 6 Drawing Sheets

(56) References Cited

U.S. PATENT DOCUMENTS

| | | |
|---|---|---|
| 5,777,629 A | 7/1998 | Baldwin |
| 5,793,385 A | 8/1998 | Nale |
| 5,794,016 A | 8/1998 | Kelleher |
| 5,798,770 A | 8/1998 | Baldwin |
| 5,831,640 A | 11/1998 | Wang et al. |
| 5,870,579 A | 2/1999 | Tan |
| 5,872,729 A | 2/1999 | Deolaliker |
| 5,913,059 A | 6/1999 | Torii |
| 5,913,925 A | 6/1999 | Kahle et al. |
| 5,944,816 A | 8/1999 | Dutton et al. |
| 5,949,920 A | 9/1999 | Jordan et al. |
| 5,958,041 A * | 9/1999 | Petolino et al. ............... 712/214 |
| 5,991,865 A | 11/1999 | Longhenry et al. |
| 6,092,175 A | 7/2000 | Levy et al. |
| 6,163,839 A | 12/2000 | Janik et al. |
| 6,188,411 B1 | 2/2001 | Lai |
| 6,219,769 B1 | 4/2001 | Strongin et al. |
| 6,226,604 B1 | 5/2001 | Ehara et al. |
| 6,279,099 B1 | 8/2001 | Van Hook et al. |
| 6,466,221 B1 | 10/2002 | Satoh et al. |
| 6,480,941 B1 | 11/2002 | Franke et al. |
| RE37,944 E | 12/2002 | Fielder et al. |
| 6,493,741 B1 | 12/2002 | Emer et al. |
| 6,515,443 B2 | 2/2003 | Kelly et al. |
| 6,516,443 B1 | 2/2003 | Zook |
| 6,549,209 B1 | 4/2003 | Shinohara et al. |
| 6,570,570 B1 | 5/2003 | Suzuki et al. |
| 6,574,725 B1 | 6/2003 | Kranich et al. |
| 6,577,762 B1 | 6/2003 | Seeger et al. |
| 6,593,932 B2 | 7/2003 | Porterfield |
| 6,614,847 B1 | 9/2003 | Das et al. |
| 6,636,214 B1 | 10/2003 | Leather et al. |
| 6,654,428 B1 | 11/2003 | Bose et al. |
| 6,693,719 B1 | 2/2004 | Gupta et al. |
| 6,697,063 B1 | 2/2004 | Zhu |
| 6,717,583 B2 | 4/2004 | Shimomura et al. |
| 6,734,861 B1 | 5/2004 | Van Dyke et al. |
| 6,744,433 B1 | 6/2004 | Bastos et al. |
| 6,792,575 B1 | 9/2004 | Samaniego et al. |
| 6,807,620 B1 * | 10/2004 | Suzuoki et al. .................... 712/2 |
| 6,825,843 B2 | 11/2004 | Allen et al. |
| 6,891,533 B1 | 5/2005 | Alcorn et al. |
| 6,891,544 B2 * | 5/2005 | Oka et al. ...................... 345/545 |
| 6,950,927 B1 * | 9/2005 | Apisdorf et al. .............. 712/216 |
| 6,952,213 B2 | 10/2005 | Ebihara |
| 6,952,440 B1 | 10/2005 | Underbrink |
| 6,958,718 B2 | 10/2005 | Symes et al. |
| 6,964,009 B2 | 11/2005 | Samaniego et al. |
| 6,972,769 B1 | 12/2005 | Nebeker et al. |
| 6,999,076 B2 | 2/2006 | Morein |
| 7,006,881 B1 | 2/2006 | Hoffberg et al. |
| 7,015,913 B1 | 3/2006 | Lindholm et al. |
| 7,015,914 B1 | 3/2006 | Bastos et al. |
| 7,027,062 B2 | 4/2006 | Lindholm et al. |
| 7,027,540 B2 | 4/2006 | Wilson et al. |
| 7,030,878 B2 | 4/2006 | Xu et al. |
| 7,034,828 B1 | 4/2006 | Drebin et al. |
| 7,068,272 B1 | 6/2006 | Voorhies et al. |
| 7,088,371 B2 | 8/2006 | Lippincott |
| 7,098,922 B1 | 8/2006 | Bastos et al. |
| 7,130,443 B1 | 10/2006 | Werner et al. |
| 7,145,565 B2 | 12/2006 | Everitt et al. |
| 7,146,486 B1 * | 12/2006 | Prokopenko et al. ........... 712/22 |
| 7,174,224 B2 | 2/2007 | Hudson et al. |
| 7,196,708 B2 | 3/2007 | Dorojevets et al. |
| 7,239,322 B2 | 7/2007 | Lefebvre et al. |
| 7,239,735 B2 | 7/2007 | Nozaki |
| 7,268,785 B1 | 9/2007 | Glanville et al. |
| 7,339,592 B2 | 3/2008 | Lindholm et al. |
| 7,358,502 B1 | 4/2008 | Appleby et al. |
| 7,372,484 B2 | 5/2008 | Mouli |
| 7,379,067 B2 | 5/2008 | Deering et al. |
| 7,388,588 B2 * | 6/2008 | D'Amora et al. ............. 345/567 |
| 7,447,873 B1 | 11/2008 | Nordquist |
| 7,557,832 B2 | 7/2009 | Lindenstruth et al. |
| 7,574,042 B2 | 8/2009 | Tsuruoka et al. |
| 7,583,294 B2 | 9/2009 | Ray et al. |
| 7,612,803 B2 | 11/2009 | Meitav et al. |
| 7,619,775 B2 | 11/2009 | Kitamura et al. |
| 7,633,506 B1 | 12/2009 | Leather et al. |
| 7,673,281 B2 | 3/2010 | Yamanaka et al. |
| 7,683,962 B2 | 3/2010 | Border et al. |
| 7,684,079 B2 | 3/2010 | Takata et al. |
| 7,733,392 B2 | 6/2010 | Mouli |
| 7,738,699 B2 | 6/2010 | Tsuruoka et al. |
| 7,808,505 B2 | 10/2010 | Deering et al. |
| 7,813,822 B1 | 10/2010 | Hoffberg |
| 7,826,092 B2 | 11/2010 | Ejima et al. |
| 7,904,187 B2 | 3/2011 | Hoffberg et al. |
| 7,920,204 B2 | 4/2011 | Miyanari |
| 7,966,078 B2 | 6/2011 | Hoffberg et al. |
| 7,987,003 B2 | 7/2011 | Hoffberg et al. |
| 8,046,313 B2 | 10/2011 | Hoffberg et al. |
| 8,054,573 B2 | 11/2011 | Mathew et al. |
| 8,154,818 B2 | 4/2012 | Mathew et al. |
| 8,165,916 B2 | 4/2012 | Hoffberg et al. |
| 2002/0091915 A1 | 7/2002 | Parady |
| 2003/0034975 A1 * | 2/2003 | Lindholm et al. ............. 345/426 |
| 2003/0080959 A1 | 5/2003 | Morein |
| 2003/0105793 A1 * | 6/2003 | Guttag et al. .................. 708/625 |
| 2003/0167379 A1 | 9/2003 | Soltis, Jr. |
| 2003/0172234 A1 | 9/2003 | Soltis, Jr. |
| 2004/0030845 A1 | 2/2004 | DeLano et al. |
| 2004/0119710 A1 | 6/2004 | Piazza et al. |
| 2004/0130552 A1 | 7/2004 | Duluk et al. |
| 2004/0172631 A1 | 9/2004 | Howard |
| 2004/0187119 A1 | 9/2004 | Janik et al. |
| 2004/0246260 A1 | 12/2004 | Kim et al. |
| 2005/0090283 A1 | 4/2005 | Rodriquez |
| 2005/0184994 A1 * | 8/2005 | Suzuoki et al. ............... 345/502 |
| 2005/0195198 A1 | 9/2005 | Anderson et al. |
| 2005/0206647 A1 | 9/2005 | Xu et al. |
| 2006/0004942 A1 | 1/2006 | Hetherington et al. |
| 2006/0020831 A1 | 1/2006 | Golla et al. |
| 2006/0028482 A1 | 2/2006 | Donovan et al. |
| 2006/0033735 A1 | 2/2006 | Seiler et al. |
| 2006/0066611 A1 | 3/2006 | Fujiwara et al. |
| 2006/0136919 A1 | 6/2006 | Aingaran et al. |
| 2007/0030280 A1 | 2/2007 | Paltashev et al. |
| 2007/0070075 A1 | 3/2007 | Hsu |
| 2007/0185953 A1 * | 8/2007 | Prokopenko et al. ......... 708/523 |
| 2007/0236495 A1 | 10/2007 | Gruber et al. |
| 2007/0252843 A1 | 11/2007 | Yu et al. |
| 2007/0257905 A1 | 11/2007 | French et al. |
| 2007/0268289 A1 | 11/2007 | Yu et al. |
| 2007/0283356 A1 | 12/2007 | Du et al. |
| 2007/0292047 A1 | 12/2007 | Jiao et al. |
| 2007/0296729 A1 | 12/2007 | Du et al. |
| 2008/0074433 A1 * | 3/2008 | Jiao et al. ...................... 345/522 |

FOREIGN PATENT DOCUMENTS

| | | | |
|---|---|---|---|
| EP | 0917056 | A2 | 5/1999 |
| JP | 3185521 | A | 8/1991 |
| JP | 9062852 | A | 3/1997 |
| JP | 9231380 | A | 9/1997 |
| JP | 2000057365 | A | 2/2000 |
| JP | 2001222712 | | 8/2001 |
| JP | 2001236221 | | 8/2001 |
| JP | 2001357410 | A | 12/2001 |
| JP | 2002269583 | | 9/2002 |
| JP | 2002529870 | A | 9/2002 |
| JP | 2006099422 | A | 4/2006 |
| RU | 2137186 | C1 | 9/1999 |
| RU | 2004109122 | | 10/2005 |
| TW | I230869 | B | 4/2005 |
| WO | 0028482 | A1 | 5/2000 |
| WO | 0215000 | | 2/2002 |
| WO | WO2005086090 | A2 | 9/2005 |

OTHER PUBLICATIONS

Lindholm et al.; "A User-Programmable Vertex Engine;" Aug. 12-17, 2001; ACM SIGGRAPH; pp. 149-158.*

(56) References Cited

OTHER PUBLICATIONS

Kilgariff et al.; "Chapter 30, The GeForce 6 Series GPU Architecture;" GPU Gems 2 Copyright 2005, pp. 471-491.*
International Search Report, PCT/US07/069803—International Search Authority—European Patent Office, Dec. 11, 2007.
Bjorke K: "High quality filtering" Chapter 24 in Book 'GPU Gems', [Online] 2004, XP002534488 Retrieved from the Internet: URL:http://http.developer.nvidia.com/GPUGems/gpugems_ch24.html> [retrieved on Jun. 29, 2009].
Blamer K et al.: "A Single Chip Multimedia Video Processor," Custom Integrated Circuits Conference, pp. 91-94, Proceedings of the IEEE (May 1994).
Segal, M. et al.: "The OpenGL Graphics System: A Specification," pp. 1-368. Version 2.0 (Oct. 22, 2004).
Waldspurger et al., Register Relocation: Flexible Contexts for Multithreading, International Symposium on Computer Architecture, Proceedings of the 20th Annual International Symposium on Computer Architecture, 1993.
Written Opinion, PCT/US07/069803—International Searching Authority—European Patent Office—Dec. 11, 2007.
Deering M. et al: "The SAGE graphics architecture" Proceedings of the 29th Annual Conference on Computer Graphics and Interactive Techniques (SIGGRAPH'02), Jul. 23-26, 2002, San Antonio, Texas, USA, 2002, pp. 683-692, XP002534489.
Hadwiger M. et al: "Hardware-accelerated high-quality filtering on PC hardware" Proceedings of 2001 Conference on Vision, Modelling and Visualization, Nov. 21-23, 2001, Stuttgart, Germany, [Online] 2001, XP002534490 Retrieved from the Internet: URL:http://www vis.informatik.uni-stuttgart.de/vmv01/d1/papers/8.pdf > [retrieved on Jun. 29, 2009].
Hopf Mi et al: "Accelerating 3D convolution using graphics hardware" Visualization '99. Proceedings San Francisco, CA, USA Oct. 24-29, 1999. Piscataway, NJ. USA, IEEE, US, Oct. 29, 1999, pp. 471-664, XP031385575 ISBN: 978-0-7803-5897-3.
Novasad J: "Advanced high quality filtering" Chapter 27 in Book 'GPU-Gems 2', [Online]. 2005, XP002534486 Retrieved from the Internet:. URL:http://http.developer.nvidia.com/GPUGe ms2/ gpugems2_chapter27.html> [retrieved on Jun. 29, 2009].
Owens J.D et al: "A survey of general-purpose computation on graphics hardware" Computer Graphics Forum, vol. 26, No. 1. Mar. 2007, pp. 80-113, XP002534491.
Sigg C. et al: "Fast third-order texture filtering" Chapter 20 in Book 'GPU Gems 2', [Online] 2005. XP002534487 Retrieved from the Internet: URL:http://http.developer.nvidia.com/GPUGe ms2/ gpugems2_chapter20.html> [retrieved on Jun. 29, 2009].
Akkary, H. and Driscoll, M. A. 1998. A dynamic multithreading processor. In Proceedings of the 31st Annual ACM/IEEE international Symposium on Microarchitecture (Dallas, Texas, United States). International Symposium on Microarchitecture. IEEE Computer So. 1998, pp. 226-236.
Kenji Watanabe, Wanming Chu, Yamin Li, "Exploiting Java Instruction/Thread Level Parallelism with Horizontal Multithreading," Australasian Computer Systems Architecture Conference, p. 122, 6th Australasian Computer Systems Architecture Conference (AustCSA.) IEEE 2001, pp. 122-129.
Translation of Office Action in Japanese application 2009-511215 corresponding to U.S. Appl. No. 11/435,454, citing WO05086090, US20030080959 and JP2001222712 dated Feb. 22, 2011.
Ying Chen, Resit Sendag, David J. Lilja, "Using Incorrect Speculation to Prefetch Data in a Concurrent Multithreaded Processor," Parallel and Distributed Processing Symposium, International, p. 76b, International Parallel and Distributed Processing Sympos., IEEE 2003, pp. 1-9.
Hiroaki Hirata, and 4 others, "An elementary processor Architecture with Parallel Instruction Issuing from Multiple Threads," Information Processing Society article magazine, Information Processing Society of Japan, 1993, vol. 34, No. 4, pp. 595-605.
Sohn, et al., "A 155-mW 50-Mvertices/s Graphics Processor With Fixed-Point Programmable Vertex Shader for Mobile Applications," IEEE Journal of Solid-State Circuits, vol. 41, No. 5, May 2006, pp. 1081-1091.
Onoue, M., et al., "3D Image Handbook", 1st ed., Asakura Publishing Co., Ltd. (Kunizou Asakura), Feb. 20, 2006, pp. 152-170.

* cited by examiner

| Clock Period | Scalar ALU1 (Pixel 1) | Scalar ALU2 (Pixel 2) | Scalar ALU3 (Pixel 3) | Scalar ALU4 (Pixel 4) |
|---|---|---|---|---|
| $T_1$ | $A_{1,1}\ B_{1,1}$ | $A_{2,1}\ B_{2,1}$ | $A_{3,1}\ B_{3,1}$ | $A_{4,1}\ B_{4,1}$ |
| $T_2$ | $+ A_{1,2}\ B_{1,2}$ | $+ A_{2,2}\ B_{2,2}$ | $+ A_{3,2}\ B_{3,2}$ | $+ A_{4,2}\ B_{4,2}$ |
| $T_3$ | $+ A_{1,3}\ B_{1,3}$ | $+ A_{2,3}\ B_{2,3}$ | $+ A_{3,3}\ B_{3,3}$ | $+ A_{4,3}\ B_{4,3}$ |
| $T_4$ | $+ A_{1,4}\ B_{1,4}$ | $+ A_{2,4}\ B_{2,4}$ | $+ A_{3,4}\ B_{3,4}$ | $+ A_{4,4}\ B_{4,4}$ |

*FIG. 3A*

| Clock Period | Quad ALU (Pixels 1 - 4) |
|---|---|
| $T_1$ | $A_{1,1}\ B_{1,1} + A_{1,2}\ B_{1,2} + A_{1,3}\ B_{1,3} + A_{1,4}\ B_{1,4}$ |
| $T_2$ | $A_{2,1}\ B_{2,1} + A_{2,2}\ B_{2,2} + A_{2,3}\ B_{2,3} + A_{2,4}\ B_{2,4}$ |
| $T_3$ | $A_{3,1}\ B_{3,1} + A_{3,2}\ B_{3,2} + A_{3,3}\ B_{3,3} + A_{3,4}\ B_{3,4}$ |
| $T_4$ | $A_{4,1}\ B_{4,1} + A_{4,2}\ B_{4,2} + A_{4,3}\ B_{4,3} + A_{4,4}\ B_{4,4}$ |

GRAPHICS PROCESSOR WITH ARITHMETIC AND ELEMENTARY FUNCTION UNITS

BACKGROUND

I. Field

The present disclosure relates generally to circuits, and more specifically to graphics processors.

II. Background

Graphics processors are widely used to render 2-dimensional (2-D) and 3-dimensional (3-D) images for various applications such as video games, graphics, computer-aided design (CAD), simulation and visualization tools, imaging, etc. A 3-D image may be modeled with surfaces, and each surface may be approximated with polygons (typically triangles). The number of triangles used to represent a 3-D image is dependent on the complexity of the surfaces as well as the desired resolution of the image and may be quite large, e.g., in the millions. Each triangle is defined by three vertices, and each vertex is associated with various attributes such as space coordinates, color values, and texture coordinates. Each attribute may have up to four components.

A graphics processor may perform various graphics operations to render an image. The graphics operations may include rasterization, stencil and depth tests, texture mapping, shading, etc. The image is composed of many triangles, and each triangle is composed of picture elements (pixels). The graphics processor renders each triangle by determining the values of the components of each pixel within the triangle.

A graphics processor may employ a shader core to perform certain graphics operations such as shading. Shading is a highly complex graphics operation involving lighting, shadowing, etc. The shader core may need to compute transcendental elementary functions such as sine, cosine, reciprocal, logarithm, exponential, square root, and reciprocal square root. These elementary functions may be approximated with polynomial expressions, which may be evaluated with relatively simple instructions executed by an arithmetic logic unit (ALU). However, shader performance may suffer greatly from computing the elementary functions in this manner using an ALU.

SUMMARY

Graphics processors capable of efficiently performing arithmetic operations and computing elementary functions are described herein. The terms "operation" and "function" are sometimes used interchangeably. A graphics processor comprises a shader core and possibly other units. The shader core has at least one ALU that can perform arithmetic operations and at least one elementary function unit that can compute elementary functions. In some embodiments, the ALU(s) and elementary function unit(s) are arranged and interconnected such that they can operate in parallel on instructions for the same or different threads to improve throughput. For example, the ALU(s) may execute one instruction for one thread, and the elementary function unit(s) may concurrently execute another instruction for another thread. These threads may be for the same or different graphics applications.

In other embodiments, the shader core has fewer elementary function units than ALUs, e.g., four ALUs and a single elementary function unit. The four ALUs may perform an arithmetic operation on (1) up to four components of an attribute for one pixel or (2) one component of an attribute for up to four pixels. The single elementary function unit may operate on one component of one pixel at a time. The use of a single elementary function unit may reduce cost (since elementary function units are more complex and costly than ALUs) while still providing good performance (since elementary functions have lower average usage than arithmetic operations).

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
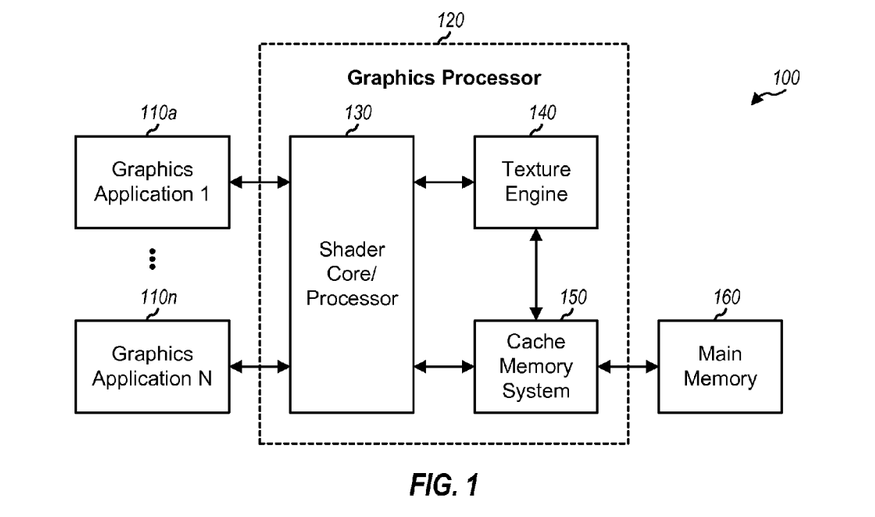
FIG. 1 shows a graphics processor supporting graphics applications.

FIG. 1 shows a block diagram of a graphics system 100 that supports N graphics applications/programs 110a through 110n, where in general N≥1. Graphics system 100 may be a stand-alone system or part of a larger system such as a computing system, a wireless communication device, etc. Graphics applications 110a through 110n may be for video games, graphics, etc., and may run concurrently. Each graphics application 110 may generate threads to achieve the desired results. A thread (or thread of execution) indicates a specific task that may be performed with a sequence of one or more instructions. Threads allow a graphics application to have multiple tasks performed simultaneously by different units and further allow different graphics applications to share resources.

A graphics processor 120 receives the threads from graphics applications 110a through 110n and performs the tasks indicated by these threads. In the embodiment shown in FIG. 1, graphics processor 120 includes a shader core/processor 130, a texture engine 140, and a cache memory system 150. A core generally refers to a processing unit within an integrated circuit. The terms "core", "engine", "processor" and "processing unit" are often used interchangeably. Shader core 130 may perform certain graphics operations such as shading and may compute transcendental elementary functions. Texture engine 140 may perform other graphics operations such as texture mapping. Cache memory system 150 may include one or more caches, which are fast memories that can store data and instructions for shader core 130 and texture engine 140.

Graphics processor 120 may include other processing and control units, engines, and memories. For example, graphics processor 120 may include one or more additional engines that perform triangle setup, rasterization, stencil and depth tests, attribute setup, pixel interpolation, etc. The various graphics operations described herein are known in the art. The additional engine(s) may be coupled between graphics applications 110 and shader core 130 or may be coupled to shader core 130. Graphics processor 120 may implement a software interface such as Open Graphics Library (OpenGL), Direct3D, etc. OpenGL is described in a document entitled "The OpenGL® Graphics System: A Specification," Version 2.0, dated Oct. 22, 2004, which is publicly available.

A main memory 160 is a large, slower memory located further away (e.g., off-chip) from graphics processor 120. Main memory 160 stores data and instructions that may be loaded into the caches within cache memory system 150.

Figure 2:
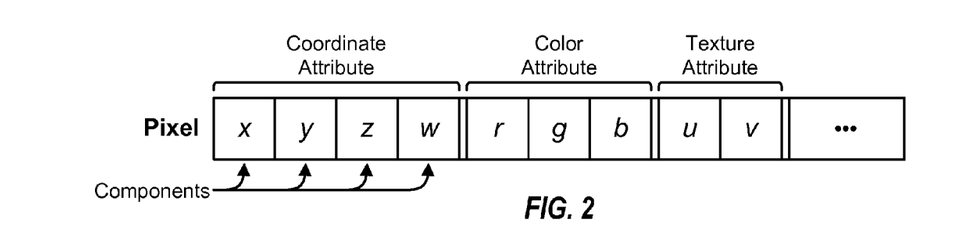
FIG. 2 illustrates attributes and components of a pixel.

FIG. 2 illustrates attributes and components of a pixel. As noted above, a 2-D or 3-D image may be composed of many triangles, and each triangle may be composed of pixels. Each pixel may have various attributes such as space coordinates, color values, texture coordinates, etc. Each attribute may have up to four components. For example, space coordinates may be given by three components for horizontal and vertical coordinates (x and y) and depth (z) or by four components x, y, z, and w, where w is a fourth term for homogeneous coordinates. Homogeneous coordinates are useful for certain graphics operations such as translation, scaling, rotation, etc. Color values are typically given by red (r), green (g), and blue (b). Texture coordinates are typically given by horizontal and vertical coordinates (u and v). A pixel may also be associated with other attributes.

In many cases, it is desirable to operate on groups of pixels in an image to be rendered. The group size may be selected based on various factors such as hardware requirements, performance, etc. A group size of 2×2 may provide a good tradeoff between the various factors. Processing on four pixels in a 2×2 grid may be performed in several manners.

Figure 3A:
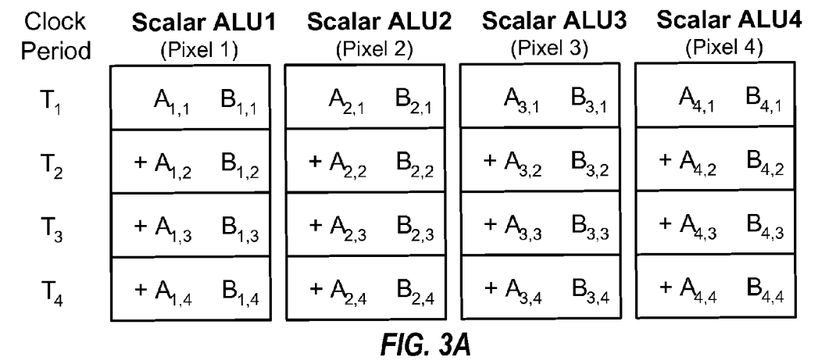
FIG. 3A shows pixel-parallel processing with four scalar ALUs.

FIG. 3A shows pixel-parallel processing on four pixels 1 through 4 with four identical scalar ALUs, ALU1 through ALU4, respectively. In this example, the four components of an attribute being operated on are denoted as $A_{p,1}, A_{p,2}, A_{p,3}$ and $A_{p,4}$, where p is a pixel index and $p \in \{1, 2, 3, 4\}$ for pixels 1 through 4. These components may be for space coordinates, color values, texture coordinates, etc. The four operands to be applied to the four components are denoted as $B_{p,1}, B_{p,2}, B_{p,3}$ and $B_{p,4}$, for $p \in \{1, 2, 3, 4\}$ and may be constants. In this example, the ALUs perform a multiply and accumulate (MAC) operation. The four components of each pixel are thus multiplied with the four operands, and the four intermediate results are accumulated to generate a final result for that pixel.

For pixel-parallel processing in FIG. 3A, each scalar ALU operates on the four components of one pixel, and the four ALUs concurrently operate on the four pixels. ALU1 multiplies component $A_{1,1}$ with $B_{1,1}$ in the first clock period $T_1$, then multiplies component $A_{1,2}$ with $B_{1,2}$ and accumulates this result with the prior result in the second clock period $T_2$, then multiplies component $A_{1,3}$ with $B_{1,3}$ and accumulates this result with the prior result in the third clock period $T_3$, then multiplies component $A_{1,4}$ with $B_{1,4}$ and accumulates this result with the prior result in the fourth clock period $T_4$. ALU2 through ALU4 similarly operate on the components of pixels 2 through 4, respectively.

Figure 3B:
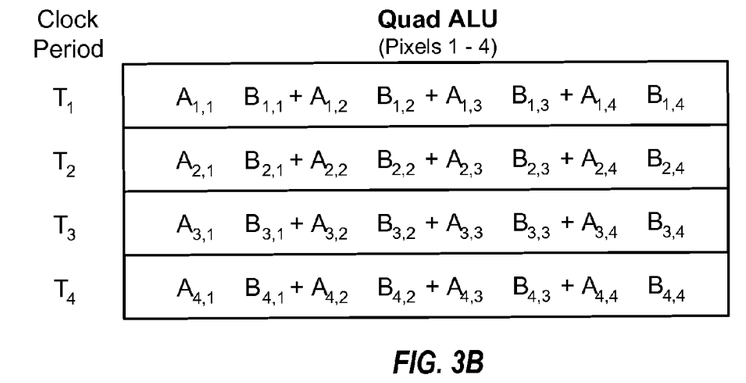
FIG. 3B shows component-parallel processing with one quad ALU.

FIG. 3B shows component-parallel processing on four pixels with one quad ALU, which may also be called a vector-based ALU. For component-parallel processing, the quad ALU operates on all four components of one pixel at a time. Thus, the quad ALU multiplies components $A_{1,1}, A_{1,2}, A_{1,3}$ and $A_{1,4}$ with operands $B_{1,1}, B_{1,2}, B_{1,3}$ and $B_{1,4}$, respectively, and accumulates the four intermediate results to obtain the final result for the first pixel in the first clock period $T_1$. The quad ALU similarly operates on the components of the second, third and fourth pixels in clock periods $T_2$, $T_3$ and $T_4$, respectively.

FIGS. 3A and 3B show two schemes for performing quad processing on up to four components of an attribute for up to four pixels. Quad processing for arithmetic operations may be performed by a single quad ALU or four scalar ALUs. In the following description, ALUs are assumed to be scalar ALUs unless noted otherwise. Quad processing may substantially improve performance. Thus, shader core 130 may be designed with capability to perform quad processing.

Figure 4:
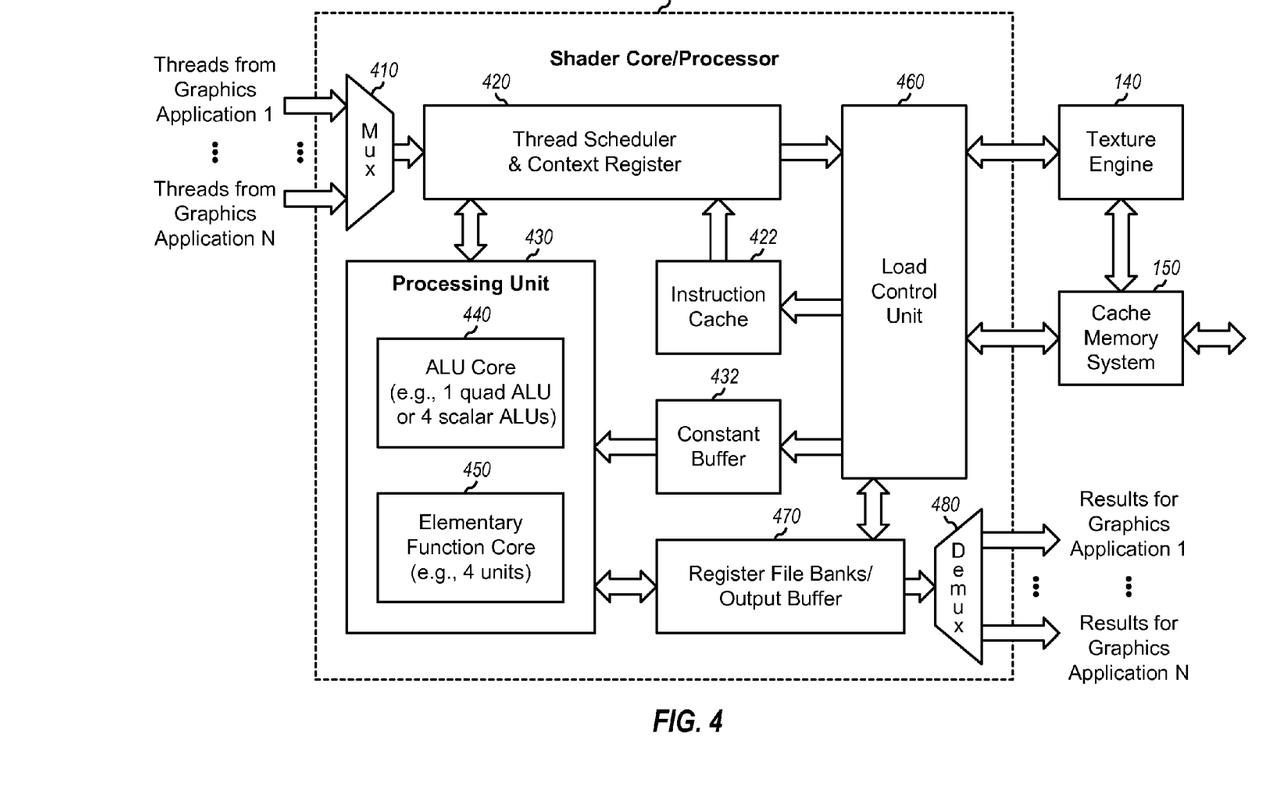
FIG. 4 shows a shader core with a 4-unit ALU core and a 4-unit elementary function (EF) core.

FIG. 4 shows a block diagram of an embodiment of a shader core/processor 130a with a 4-unit ALU core 440 and a 4-unit elementary function core 450. Shader core 130a may be used for shader core 130 in FIG. 1.

Within shader core 130a, a multiplexer (Mux) 410 receives threads from graphics applications 110a through 110n and provides these threads to a thread scheduler and context register 420. Thread scheduler 420 performs various functions to schedule and manage execution of threads. Thread scheduler 420 determines whether to accept new threads, creates a register map table for each accepted thread, and allocates resources to the threads. The register map table indicates mapping between logical register address to physical register file address. For each thread, thread scheduler 420 determines whether resources required for that thread are ready, pushes the thread into a sleep queue if any resource (e.g., instruction, register file, or texture read) for the thread is not ready, and moves the thread from the sleep queue to an active queue when all of the resources are ready. Thread scheduler 420 interfaces with a load control unit 460 in order to synchronize the resources for the threads.

Thread scheduler 420 also manages execution of threads. Thread scheduler 420 fetches the instruction(s) for each thread from an instruction cache 422, decodes each instruction if necessary, and performs flow control for the thread. Thread scheduler 420 selects active threads for execution, checks for read/write port conflict among the selected threads and, if there is no conflict, sends instruction(s) for one thread into a processing core 430 and sends instruction(s) for another thread to load control unit 460. Thread scheduler 420 maintains a program/instruction counter for each thread and updates this counter as instructions are executed or program flow is altered. Thread scheduler 420 also issues requests to fetch for missing instructions and removes threads that are completed.

Instruction cache 422 stores instructions for the threads. These instructions indicate specific operations to be performed for each thread. Each operation may be an arithmetic operation, an elementary function, a memory access operation, etc. Instruction cache 422 may be loaded with instructions from cache memory system 150 and/or main memory 160, as needed, via load control unit 460

In the embodiment shown in FIG. 4, processing core 430 includes ALU core 440 and elementary function core 450. ALU core 440 performs arithmetic operations such as addition, subtraction, multiplication, multiply and accumulate, absolute, negation, comparison, saturation, etc. ALU core 440 may also perform logical operations such as AND, OR, XOR, etc. ALU core 440 may also perform format conversion, e.g., from integers to floating point numbers, and vice versa. In the embodiment shown in FIG. 4, ALU core 440 may be a single quad ALU or four scalar ALUs. ALU core 440 may perform pixel-parallel processing on one component of an attribute for up to four pixels, as shown in FIG. 3A. Alternatively, ALU core 440 may perform component-parallel processing on up to four components of an attribute for a single pixel, as shown in FIG. 3B.

In the embodiment shown in FIG. 4, elementary function core 450 is composed of four elementary function units that can compute an elementary function for one component of an attribute for up to four pixels (pixel-parallel) or up to four components of an attribute for one pixel (component-parallel). Elementary function core 450 may compute transcendental elementary functions such as sine, cosine, reciprocal, logarithm, exponential, square root, reciprocal square root, etc, which are widely used in shader instructions. Elementary function core 450 may improve shader performance by computing the elementary functions in much less time than the time required to perform polynomial approximations of the elementary functions using simple instructions.

Load control unit 460 controls the flow of data and instructions for various units within shader core 130*a*. Load control unit 460 interfaces with cache memory system 150 and loads instruction cache 422, a constant buffer 432, and register file banks/output buffer 470 with data and instructions from cache memory system 150. Load control unit 460 also saves the data in output buffer 470 to cache memory system 150. Load control unit 460 also provides instructions to texture engine 140.

Constant buffer 432 stores constant values used by ALU core 440. Output buffer 470 stores temporary results as well as final results from ALU core 440 and elementary function core 450 for threads. A demultiplexer (Demux) 480 receives the final results for the executed threads from output buffer 470 and provides these results to the graphics applications.

In the embodiment shown in FIG. 4, processing core 430 includes both ALU core 440 and elementary function core 450. This embodiment allows ALU core 440 and elementary function core 450 to share buses that couple cores 440 and 450 to other units (e.g., thread scheduler 420 and output buffer 470) within shader core 130*a*.

Elementary function units are generally more complex than ALUs. Even with cost-effective implementations, elementary function units typically occupy much larger circuit area than ALUs and are thus more expensive than ALUs. To achieve high shader throughput for all shader instructions, the number of elementary function units may be selected to match the number of ALUs, which is four in the embodiment shown in FIG. 4. However, studies have shown that even though elementary functions are widely used, the average usage of elementary functions is fairly lower than the average usage of ALU operations. The lower average usage results from elementary functions being called less often than arithmetic operations as well as fewer components being operated on by elementary functions than arithmetic operations. For example, elementary functions are typically called less often than arithmetic operations and may thus be adequately supported by fewer elementary function units. Furthermore, while it may be common to perform addition or multiplication on all four components of an attribute, which would then benefit from having four ALUs, it is less common to perform an elementary function on all four components. Hence, fewer elementary function units may be able to provide good performance in many cases in which elementary functions are performed on only a subset of the components, e.g., one or two components. Implementing fewer elementary function units may reduce cost while still providing good performance.

Figure 5:
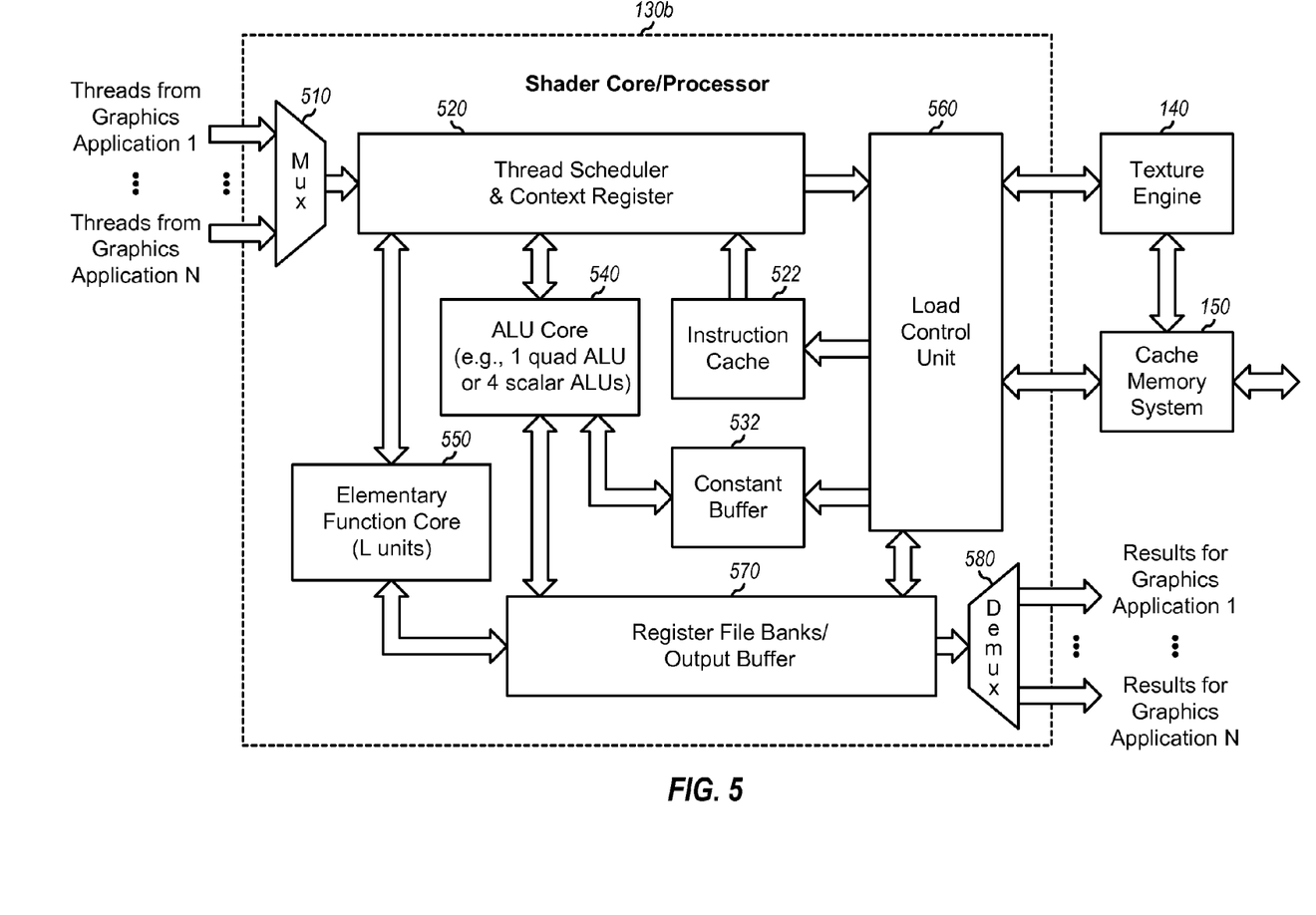
FIG. 5 shows a shader core with parallel ALU core and EF core.

FIG. 5 shows a block diagram of an embodiment of a shader core 130*b* with a 4-unit ALU core 540 and an L-unit elementary function core 550, where $1 \leq L < 4$. Shader core 130*b* may also be used for shader core 130 in FIG. 1. Shader core 130*b* includes a multiplexer 510, a thread scheduler and context register 520, an instruction cache 522, a constant buffer 532, ALU core 540, elementary function core 550, a load control unit 560, register file banks/output buffer 570, and a demultiplexer 580 that operate in similar manner as units 410, 420, 422, 432, 440, 450, 460, 470 and 480, respectively, in FIG. 4.

ALU core 540 may be a single quad ALU or four scalar ALUs. ALU core 540 couples to thread scheduler 520, constant buffer 532, and output buffer 570 via one set of buses. Elementary function core 550 may be composed of one, two or three (L) elementary function units that can compute an elementary function for either L components of one pixel or one component of L pixels. Elementary function core 550 couples to thread scheduler 520, constant buffer 532, and output buffer 570 via another set of buses. In the embodiment shown in FIG. 5, ALU core 540 and elementary function core 550 are implemented separately from one another and are coupled to other units within shader core 130*b* via separate buses. ALU core 540 and elementary function core 550 may then operate on different instructions in parallel. These instructions may be for the same or different graphics applications.

In the embodiment shown in FIG. 5, the number of elementary function units is fewer than the number of ALUs and may be selected based on a tradeoff between cost and performance. In many cases, elementary function core 550 will be able to keep pace with ALU core 540 because of the lower average usage of elementary functions. Thread scheduler 520 appropriately schedules elementary function operations with knowledge that L (instead of four) elementary function units are available for use.

Figure 6:
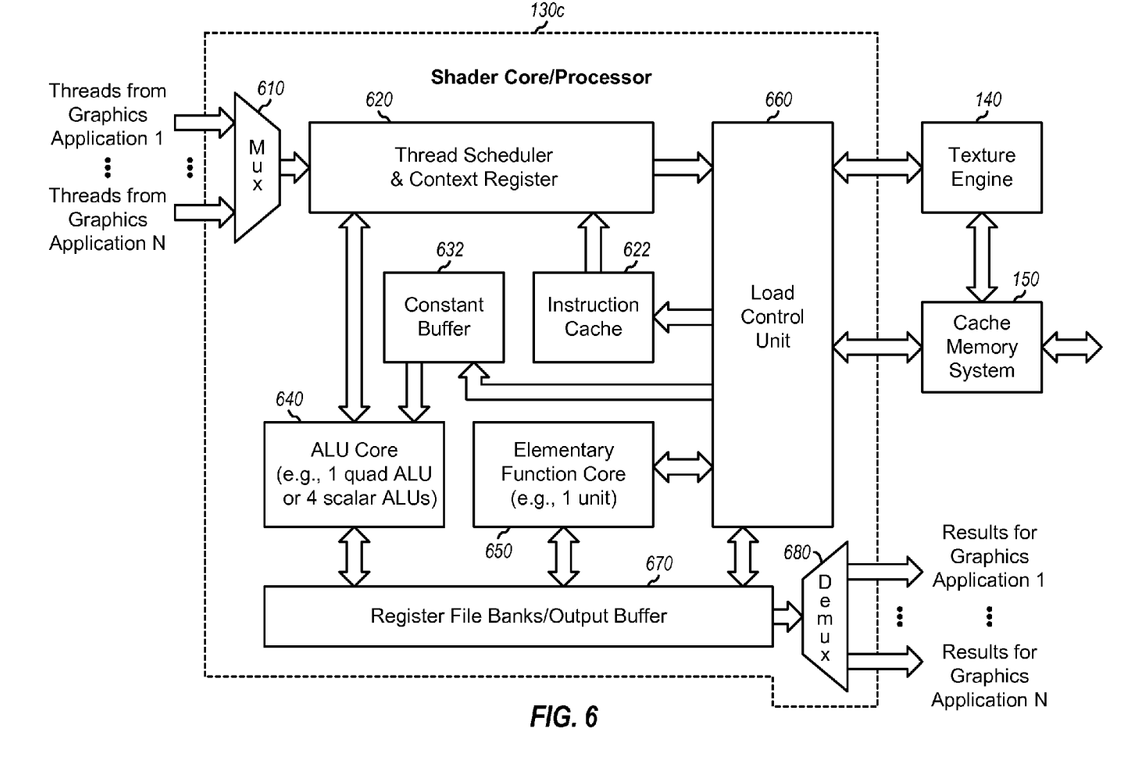
FIG. 6 shows a shader core with a 4-unit ALU core and a 1-unit EF core.

FIG. 6 shows a block diagram of an embodiment of a shader core/processor 130*c* with a 4-unit ALU core 640 and a 1-unit elementary function core 650. Shader core 130*c* may also be used for shader core 130 in FIG. 1. Shader core 130*c* includes a multiplexer 610, a thread scheduler and context register 620, an instruction cache 622, a constant buffer 632, ALU core 640, elementary function core 650, a load control unit 660, register file banks/output buffer 670, and a demultiplexer 680 that operate in similar manner as units 410, 420, 422, 432, 440, 450, 460, 470 and 480, respectively, in FIG. 4.

ALU core 640 may be a single quad ALU or four scalar ALUs. ALU core 640 couples to thread scheduler 620, constant buffer 632, and output buffer 670 via a set of buses. Elementary function core 650 may be composed of a single elementary function unit that can compute an elementary function for one component of one pixel at a time. In the embodiment shown in FIG. 6, elementary function core 650 couples to load control unit 660 and output buffer 670. This embodiment reduces the number of buses to support separate ALU core 640 and elementary function core 650. This embodiment may also provide other benefits such as more efficient sharing of resources such as register file read/write port, instruction decode, etc.

Instructions for elementary functions (or EF instructions) may be generated in an appropriate manner given the design as well as the placement of elementary function core 650 within shader core 130c. If the number of EF units is equal to the number of ALU units (e.g., as shown in FIG. 4) and if the EF units have the same pipeline latency as the ALU units, then the EF instructions may be treated as ALU instructions with predictable pipeline delay. However, uneven implementations of ALU core 640 and elementary function core 650 may result in uneven throughput. Thus, in an embodiment, shader core 130c treats elementary function core 650 as a load resource and processes EF instructions in similar manner and with the same synchronization as, e.g., a texture load or a memory load. For example, a shader compiler may compile EF instructions as instructions related to texture load instead of as ALU instructions, which may be the case in the embodiments shown in FIGS. 4 and 5.

Figure 3C:
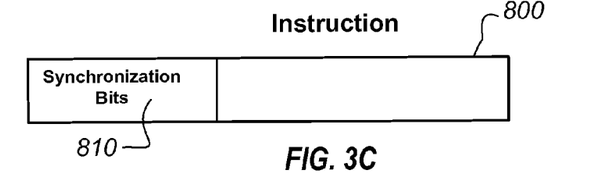
FIG. 3C shows an example instruction with synchronization bits.
Figure 3D:
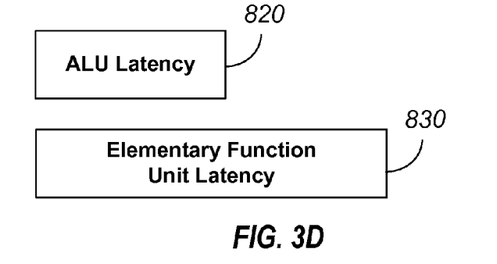
FIG. 3D is an example illustration of latencies of an ALU and an elementary function unit.

The shader compiler may include synchronization (sync) bits 810 in instructions 800 as appropriate. FIG. 3C shows an example instruction 800 with synchronization bits 810. A sync bit 810 may indicate that the current instruction 800 which contains the sync bit 810 has data dependency with one or more previous instructions 800, which may have unpredictable delay or latency. The unpredictable latency may be due to several sources. First, unpredictable latency of texture load or memory load may result from unpredictable execution conditions such as a cache hit/miss, memory access competence, memory access sequence, etc. Second, unpredictable latency may be caused by uneven implementations of the ALU core and the elementary function core. FIG. 3D is an example illustration of latencies of an ALU and an elementary function unit. Latency 820 illustrates an example of the latency of an ALU, and latency 830 illustrates an example of the latency of an elementary function unit, which is different than the latency of an ALU, e.g., latency 820. Although FIG. 3D illustrates that latency 820 is less than latency 830, aspects of this disclosure should not be considered as limited to the example of FIG. 3D. The shader compiler may insert sync bits 810 in instructions 800 that have data dependency with previous EF instructions, which may have unpredictable delay. These sync bits 810 ensure that the instructions 800 follow their dependent EF instructions and hence operate on the proper data.

In the embodiment shown in FIG. 6, thread scheduler 620 may generate elementary function requests that may share a bus with data load requests. This shared bus may comprise the bus from thread scheduler 620 to load control unit 660. However, elementary function core 650 may execute in parallel with load instructions in load control unit 660. In another embodiment, elementary function core 650 is coupled directly to thread scheduler 620 via a dedicated bus, e.g., as shown in FIG. 5. In this embodiment, elementary function requests and data load requests may use separate buses. In both embodiments, thread scheduler 620, ALU core 640, elementary function core 650, and load control unit 660 may operate in parallel on different threads for improved performance.

FIGS. 4 through 6 show specific embodiments of shader cores 130a, 130b and 130c. Other variations of shader cores 130a, 130b and 130c are also possible. For example, elementary function core 450 in FIG. 4 may include fewer than four elementary function units. As another example, elementary function core 650 in FIG. 6 may include more than one elementary function unit, e.g., two elementary function units.

In general, a shader core may include any number of processing, control and memory units, which may be arranged in any manner. These units may also be referred to by other names. For example, a load control unit may also be called an input/output (I/O) interface unit. In some embodiments, a shader core may include fewer elementary function units than ALUs to reduce cost with little degradation in performance. In other embodiments, a shader core may include separate ALU core and elementary function core that can operate on different instructions for the same or different graphics applications in parallel. The ALUs and elementary function units may be implemented with various designs known in the art. A shader core may also interface with external units via synchronous and/or asynchronous interfaces.

The graphics processors and shader cores described herein may be used for wireless communication, computing, networking, personal electronics, etc. An exemplary use of a graphics processor for wireless communication is described below.

Figure 7:
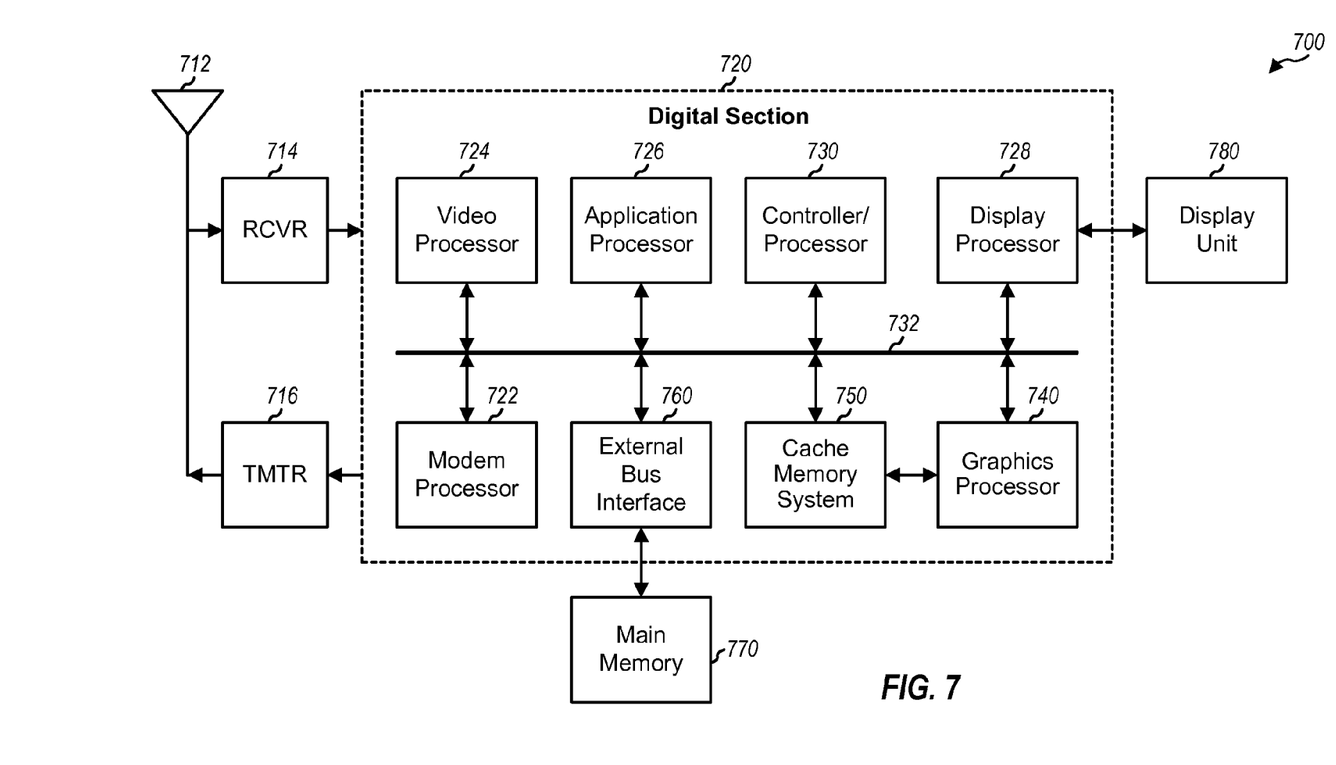
FIG. 7 shows a block diagram of a wireless device with a graphics processor.

FIG. 7 shows a block diagram of an embodiment of a wireless device 700 in a wireless communication system. Wireless device 700 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 700 is capable of providing bi-directional communication via a receive path and a transmit path. On the receive path, signals transmitted by base stations are received by an antenna 712 and provided to a receiver (RCVR) 714. Receiver 714 conditions and digitizes the received signal and provides samples to a digital section 720 for further processing. On the transmit path, a transmitter (TMTR) 716 receives data to be transmitted from digital section 720, processes and conditions the data, and generates a modulated signal, which is transmitted via antenna 712 to the base stations.

Digital section 720 includes various processing and interface units such as, for example, a modem processor 722, a video processor 724, an application processor 726, a display processor 728, a controller/processor 730, a graphics processor 740, and an external bus interface (EBI) 760. Modem processor 722 performs processing for data transmission and reception (e.g., encoding, modulation, demodulation, and decoding). Video processor 724 performs processing on video content (e.g., still images, moving videos, and moving texts) for video applications such as camcorder, video playback, and video conferencing. Application processor 726 performs processing for various applications such as multi-way calls, web browsing, media player, and user interface. Display processor 728 performs processing to facilitate the display of videos, graphics, and texts on a display unit 780. Controller/processor 730 may direct the operation of various processing and interface units within digital section 720.

Graphics processor 740 performs processing for graphics applications and may be implemented as described above. For example, graphics processor 740 may include shader core/processor 130 and texture engine 140 in FIG. 1. A cache memory system 750 stores data and/or instructions for graphics processor 740. Cache memory system 750 may be implemented with (1) configurable caches that may be assigned to different engines within graphics processor 740 and/or (2) dedicated caches that are assigned to specific engines. EBI 760 facilitates transfer of data between digital section 720 (e.g., the caches) and main memory 770.

Digital section 720 may be implemented with one or more digital signal processors (DSPs), micro-processors, reduced instruction set computers (RISCs), etc. Digital section 720 may also be fabricated on one or more application specific integrated circuits (ASICs) or some other type of integrated circuits (ICs).

The graphics processors and shader cores/processors described herein may be implemented in various hardware units. For example, the graphics systems and shader cores/processors may be implemented in ASICs, digital signal processors (DSPs), digital signal processing device (DSPDs), programmable logic devices (PLDs), field programmable gate array (FPGAs), processors, controllers, micro-controllers, microprocessors, and other electronic units.

Certain portions of the graphics processors may be implemented in firmware and/or software. For example, the thread scheduler and/or load control unit may be implemented with firmware and/or software modules (e.g., procedures, functions, and so on) that perform the functions described herein. The firmware and/or software codes may be stored in a memory (e.g., memory 750 or 770 in FIG. 7) and executed by a processor (e.g., processor 730). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   an output buffer;
   at least one arithmetic logic unit (ALU) operative to perform arithmetic operations based on ALU instructions of one thread; and
   at least one elementary function unit operative to compute elementary functions based on elementary function unit instructions of the one thread, wherein the at least one elementary function unit and the at least one ALU are independently coupled to the output buffer and are configured to operate on different instructions of the one thread in parallel, and wherein the ALU instructions of the one thread comprise synchronization bits, as part of the ALU instructions of the one thread, that ensure that the ALU instructions of the one thread that are dependent upon the elementary function unit instructions of the one thread follow the elementary function unit instructions of the one thread upon which the ALU instructions of the one thread depend.

2. The apparatus of claim 1, wherein the at least one ALU comprises at least four ALUs.

3. The apparatus of claim 2, wherein the at least four ALUs are operable to perform an arithmetic operation on up to four components of an attribute for a pixel.

4. The apparatus of claim 2, wherein the at least four ALUs are operable to perform an arithmetic operation on a component of an attribute for up to four pixels.

5. The apparatus of claim 1, wherein the at least one ALU comprises more than one ALU, and wherein the at least one elementary function unit comprises fewer elementary function units than ALUs.

6. The apparatus of claim 1, wherein the at least one elementary function unit comprises a single elementary function unit.

7. The apparatus of claim 1, wherein the at least one ALU and the at least one elementary function unit have different latency.

8. The apparatus of claim 1, further comprising:
   a load control unit operative to facilitate exchanges of data between the at least one ALU and a memory system and between the at least one elementary function unit and the memory system.

9. The apparatus of claim 8, wherein the at least one elementary function unit is coupled to the load control unit.

10. The apparatus of claim 9, wherein the at least one elementary function unit is operable in parallel with the load control unit.

11. The apparatus of claim 9, wherein requests for the at least one elementary function unit and load requests for the load control unit share a bus, and wherein the at least one elementary function unit and the load control unit are operable to execute different threads in parallel.

12. The apparatus of claim 1, further comprising:
   a scheduler operative to receive threads from at least one graphics application and to schedule execution of the threads, one thread at a time, by the at least one ALU and the at least one elementary function unit.

13. The apparatus of claim 12, wherein the at least one elementary function unit is coupled to the scheduler.

14. An integrated circuit comprising:
   an output buffer;
   at least one arithmetic logic unit (ALU) operative to perform arithmetic operations based on ALU instructions of one thread; and
   at least one elementary function unit operative to compute elementary functions based on elementary function unit instructions of the one thread, wherein the at least one elementary function unit and the at least one ALU are independently coupled to the output buffer and are configured to operate on different instructions of the one thread in parallel, and wherein the ALU instructions of the one thread comprise synchronization bits, as part of the ALU instructions of the one thread, that ensure that the ALU instructions of the one thread that are dependent upon the elementary function unit instructions of the one thread follow the elementary function unit instructions of the one thread upon which the ALU instructions of the one thread depend.

15. The integrated circuit of claim 14, wherein the at least one ALU comprises at least four ALUs and fewer than four elementary function units.

16. The integrated circuit of claim 14, wherein the integrated circuit comprises more than one ALU, and wherein the integrated circuit comprises fewer elementary function units than ALUs.

17. The integrated circuit of claim 14, further comprising:
   a processing unit that includes the at least one ALU and the at least one elementary function unit.

18. A wireless device comprising:
   a graphics processor comprising:
      an output buffer;
      at least one arithmetic logic unit (ALU) operative to perform arithmetic operations based on ALU instructions of one thread; and
      at least one elementary function unit operative to compute elementary functions based on elementary function unit instructions of the one thread, wherein the at least one elementary function unit and the at least one ALU are independently coupled to the output buffer and are configured to operate on different instructions of the one thread in parallel, and wherein the ALU instructions of the one thread comprise synchronization bits, as part of the ALU instructions of the one thread, that ensure that the ALU instructions of the one thread that are dependent upon the elementary function unit instructions of the one thread follow the elementary function unit instructions of the one thread upon which the ALU instructions of the one thread depend; and a memory system operative to store data for the graphics processor.

19. The wireless device of claim 18, wherein the graphics processor comprises at least four ALUs and fewer than four elementary function units.

20. A method comprising:

performing, with at least one arithmetic logic unit (ALU), arithmetic operations based on ALU instructions of one thread; and computing, with at least one elementary function unit, elementary functions based on elementary function unit instructions of the one thread;

wherein the ALU and the elementary function unit are independently coupled to an output buffer and operate on different instructions of the one thread in parallel, and wherein the ALU instructions of the one thread comprise synchronization bits, as part of the ALU instructions of the one thread, that ensure that the ALU instructions of the one thread that are dependent upon the elementary function unit instructions of the one thread follow the elementary function unit instructions of the one thread upon which the ALU instructions of the one thread depend.

21. The method of claim 20, wherein performing arithmetic operations with at least one ALU comprises performing, with at least four ALUs, the arithmetic operations based on the ALU instructions of the one thread.

22. The method of claim 21, wherein performing, with the at least four ALUs, the arithmetic operations comprises performing, with the at least four ALUs, the arithmetic operations on up to four components of an attribute for a pixel.

23. The method of claim 21, wherein performing, with the at least four ALUs, the arithmetic operations comprises performing, with the at least four ALUs, the arithmetic operations on a component of an attribute for up to four pixels.

24. The method of claim 20, wherein performing the arithmetic operations comprises performing, with more than one ALU, the arithmetic operations, and wherein computing elementary functions comprises computing, with fewer elementary function units than ALUs, the elementary functions.

25. The method of claim 20, wherein computing elementary functions comprises computing, with a single elementary function unit, the elementary functions.

26. The method of claim 20, wherein the at least one ALU and the at least one elementary function unit have different latency.

27. The method of claim 20, further comprising:

facilitating, with a load control unit, exchanges of data between the at least one ALU and a memory system, and between the at least one elementary function unit and the memory system.

28. The method of claim 20, further comprising:

receiving, with a scheduler, threads from at least one graphics application, and scheduling, with the scheduler, execution of the threads, one thread at a time, by the at least one ALU and the at least elementary function unit.

29. An apparatus comprising:

an output buffer;

means for performing arithmetic operations based on arithmetic logic unit (ALU) instructions of one thread; and means for computing elementary functions based on elementary function unit instructions of the one thread, wherein the means for performing and the means for computing are independently coupled to the output buffer and are configured to operate on different instructions of the one thread in parallel, and wherein the ALU instructions of the one thread comprise synchronization bits, as part of the ALU instructions of the one thread, that ensure that the ALU instructions of the one thread that are dependent upon the elementary function unit instructions of the one thread follow the elementary function unit instructions of the one thread upon which the ALU instructions of the one thread depend.

30. The apparatus of claim 29, wherein the means for performing comprises at least four ALUs.

31. The apparatus of claim 30, wherein the at least four ALUs are configured to perform an arithmetic operation on up to four components of an attribute for a pixel.

32. The apparatus of claim 30, wherein the at least four ALUs are configured to perform an arithmetic operation on a component of an attribute for up to four pixels.

33. The apparatus of claim 29, wherein the means for performing comprises more than one ALU, and wherein the means for computing comprises fewer elementary function units than ALUs.

34. The apparatus of claim 29, wherein the means for computing comprises a single elementary function unit.

35. The apparatus of claim 29, wherein the means for performing comprises at least one ALU, wherein the means for computing comprises at least one elementary function unit, and wherein the at least one ALU and the at least one elementary function unit have different latency.

36. The apparatus of claim 29, wherein the apparatus comprises one of:

an integrated circuit; and a wireless device.

37. A non-transitory computer-readable storage medium having stored thereon instructions, when executed, cause one or more processors to:

perform, with at least one arithmetic logic unit (ALU), arithmetic operations based on ALU instructions of one thread; and compute, with at least one elementary function unit, elementary functions based on elementary function unit instructions of the one thread;

wherein the ALU and the elementary function unit are independently coupled to an output buffer and operate on different instructions of the one thread in parallel, and wherein the ALU instructions of the one thread comprise synchronization bits, as part of the ALU instructions of the one thread, that ensure that the ALU instructions of the one thread that are dependent upon the elementary function unit instructions of the one thread follow the elementary function unit instructions of the one thread upon which the ALU instructions of the one thread depend.

38. The computer-readable storage medium of claim 37, wherein the instructions that cause the one or more processors to perform arithmetic operations comprise instructions that cause the one or more processors to perform, with at least four ALUs, the arithmetic operations based on the ALU instructions of the one thread.

39. The computer-readable storage medium of claim 38, wherein the instructions that cause the one or more processors to perform, with the at least four ALUs, the arithmetic operations comprise instructions that cause the one or more processors to perform, with the at least four ALUs, the arithmetic operations on up to four components of an attribute for a pixel.

40. The computer-readable storage medium of claim 38, wherein the instructions that cause the one or more processors to perform, with the at least four ALUs, the arithmetic operations comprise instructions that cause the one or more processors to perform, with the at least four ALUs, the arithmetic operations on a component of an attribute for up to four pixels.

41. The computer-readable storage medium of claim 37, wherein the instructions that cause the one or more processors to perform the arithmetic operations comprise instructions that cause the one or more processors to perform, with multiple ALUs, the arithmetic operations, and wherein the instructions that cause the one or more processors to compute elementary functions comprise instructions that cause the one or more processors to compute, with fewer elementary function units than ALUs, the elementary functions.

42. The computer-readable storage medium of claim 37, wherein the instructions that cause the one or more processors to compute elementary functions comprise instructions that cause the one or more processors to compute, with a single elementary function unit, the elementary functions.

43. The computer-readable storage medium of claim 37, wherein the at least one ALU and the at least one elementary function unit have different latency.

* * * * *